L. T. LE BRON, Jr.
TELESCOPE.
APPLICATION FILED OCT. 12, 1917.
1,280,049.
Patented Sept. 24, 1918.
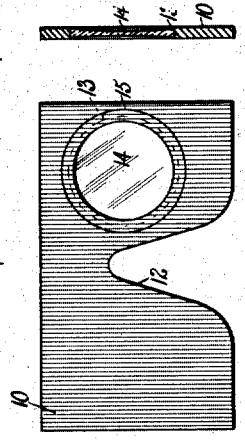
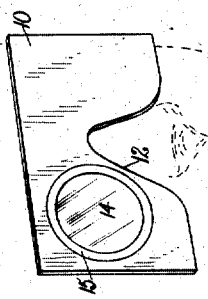
WITNESSES
INVENTOR
Leo T. LeBron Jr.
BY
ATTORNEYS

UNITED STATES PATENT OFFICE.

LEO T. LE BRON, JR., OF GALENA, ILLINOIS.

TELESCOPE.

1,280,049.  Specification of Letters Patent.  Patented Sept. 24, 1918.

Application filed October 12, 1917. Serial No. 196,166.

*To all whom it may concern:*

Be it known that I, LEO T. LE BRON, Jr., a citizen of the United States, and a resident of Galena, in the county of Jo Daviess and State of Illinois, have invented a new and Improved Telescope, of which the following is a full, clear, and exact description.

This invention relates to telescopes and has for its object to provide a telescope consisting of two flat members with lenses which may be placed together in the pocket of a close fitting uniform. One of the members is cut out to fit the nose of the user and the lens is disposed at one side of the cut out portion, so that when in use, the surface of the member at the other side of the cut out portion will serve as a blind. The lens in the other member is disposed at one of its ends so that the two members which are of substantially the same size may be placed one flat against the other and with the lenses at opposite ends.

Additional objects of the invention will appear in the following specification in which the preferred form of my invention is described.

In the drawings, similar reference characters refer to similar parts in all the views in which—

Figure 1 is a perspective view illustrating the manner in which the invention is used.

Fig. 2 is a view showing in elevation one of the members.

Fig. 3 is a transverse sectional view of Fig. 2.

Fig. 4 is a view showing in elevation the other member, and

Fig. 5 is a transverse sectional view of Fig. 4.

By referring to the drawings, it will be seen that the telescope is constructed of two members 10 and 11, which are free from each other so that they may be moved one relatively to the other as may be desired, the said members 10 and 11 being flat so that when the telescope is not in use, one of the members 10 or 11 may be disposed flat against the other member preferably with the lenses with which the members 10 and 11 are provided at opposite ends, so that the two members may be disposed in the pocket of a close fitting uniform. It will be seen that it will be possible for a soldier to conveniently carry these members 10 and 11 in his pocket and that they may be readily used as a telescope when desired.

The member 10 is provided with a cut out portion 12 which will fit around the nose of the user, this member 10 being provided with an opening 13 at one side of its cut out portion 12 in which a lens 14 is disposed, this lens 14 being held in the opening 13 by heavy paper 15 which is glued to each side of the outer portion of the lens 14 to the member 10 adjacent thereto. In this way, the lens is cheaply secured in position in the opening 13 in the member 10.

The other member 11 has a similar opening 16 adjacent one of its ends, and in this opening 16 a lens 17 is disposed, the lens 17 being secured by paper 18 which is glued to the edges of the lens 17 and to the member 11 adjacent the opening 16.

Inasmuch as the lens 14 is disposed at one side of the cut-away portion 12 in the member 10, and as the member 10 is opaque, it will be understood that when the member 10 is disposed in position as indicated in Fig. 1 of the drawings, that the lens 14 will be in position in front of one of the eyes of the user, while the opaque member 10 will serve as a blind at the user's other eye. The member 11 is also opaque.

I prefer to use black paper 15 and 18 which is employed for securing the lenses 14 and 17 in position. When not in use, I prefer to dispose the member 11 against the member 10, and with the lens 17 against the opaque side of the member 10, so that the lenses will not be disposed one against the other, for, when the members are carried in this manner in the pocket, there is less danger of breakage than would be the case should the lenses 14 and 17 be disposed side by side.

It will be understood that in place of the black paper 15 and 18, black fiber or black enameled metal may be employed, and that the paper, fiber or metal may be fastened by glue, cement or by crimping of the members 10 and 11 which may be manufactured of cardboard, fiber or of metal.

What I claim is:

1. In a telescope, two opaque detached members, one having a cut out portion to fit around the nose of the user, there being an opening in the last member at one side of the cut out portion, and there being an opening in the other member, and two lenses, one in each opening.

2. In a telescope, two opaque flat detached members, one having a cut out portion to fit around the nose of the user, there being an opening in the last member at one side of the cut out portion, and there being an opening in one end of the other member, and two lenses, one disposed in each opening.

<div style="text-align:right">LEO T. LE BRON, Jr.</div>

Copies of this patent may be obtained for five cents each, by addressing the "Commissioner of Patents. Washington, D. C."